(12) United States Patent
Hwang et al.

(10) Patent No.: US 7,783,425 B1
(45) Date of Patent: Aug. 24, 2010

(54) INTEGRITY-OPTIMIZED RECEIVER AUTONOMOUS INTEGRITY MONITORING (RAIM)

(75) Inventors: Patrick Y. Hwang, Marion, IA (US); R. Grover Brown, Clear Lake, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1367 days.

(21) Appl. No.: 11/170,660

(22) Filed: Jun. 29, 2005

(51) Int. Cl.
*G01C 21/30* (2006.01)
*G01C 21/00* (2006.01)
*G01C 21/32* (2006.01)

(52) U.S. Cl. .................. 701/214; 701/1; 701/9; 701/14; 701/17; 701/200; 701/207; 701/210; 701/218; 701/219; 701/221

(58) Field of Classification Search ............... None
See application file for complete search history.

(56) References Cited

U.S. PATENT DOCUMENTS 5,600,329 A * 2/1997 Brenner ............... 342/357.03
5,831,576 A * 11/1998 Sheynblat ............ 342/357.03
5,923,286 A * 7/1999 Divakaruni ........... 342/357.06
6,134,484 A * 10/2000 Geier et al. ............... 701/13
6,313,786 B1 * 11/2001 Sheynblat et al. ...... 342/357.02

OTHER PUBLICATIONS

Brown, R. Grover, "A Baseline GPS RAIM Scheme and a Note on the Equivalence of Three RAIM Methods", Navigation: *Journal of The Institute of Navigation*, vol. 39, No. 3, 1992, (pp. 101-116).
Brown et al., "GPS RAIM: Calculation of Threshold and Protection Radius Using Chi-Square Methods_A Geometric Approach", Invited Paper, Submitted Feb. 1997, Revised Sep. 1997, (pp. 155-178).

(Continued)

*Primary Examiner*—Khoi Tran
*Assistant Examiner*—Bhavesh V Amin
(74) *Attorney, Agent, or Firm*—Matthew J. Evans; Daniel M. Barbieri

(57) ABSTRACT

An integrity monitoring method for an aircraft is disclosed. The integrity monitoring method includes determining a set of non-uniform weights. The non-uniform weights are based on a least squares approximation of a linearized measurement equation. The integrity monitoring method also includes applying the non-uniform weights in a receiver autonomous integrity monitoring (RAIM) system. Further, the integrity monitoring method includes determining a reduced integrity limit based on the output of the RAIM system.

16 Claims, 8 Drawing Sheets

UPPER BOUND REPRESENTATION OF MISSED DETECTION IN P-E SPACE

BIVARIATE GAUSSIAN PARAMETERS IN P-E SPACE

OTHER PUBLICATIONS

Hwang, Patrick Y., "Applying NioRAIM to the Solution Separation Method for Inertially-Aided Aircraft Autonomous Integrity Monitoring", undated, (8 pages).

Hwang, et al., "RAIM FDE Revisited: A New Breakthrough In Availability Performance With *Nio*RAIM (Novel Integrity-Optimized RAIM)", undated, (12 pages).

Hwang et al., "RAIM FDE Revisited: A New Breakthrough In Availability Performance With *Nio*RAIM (Novel Integrity-Optimized RAIM)", undated, (11 pages).

Ober, P.B., "Position Domain Integrity Assessment", ION GPS 2000, Sep. 19-22, 2000, (pp. 1948-1956).

Ober, P.B., "Towards High Integrity Positioning", ION GPS '99, Sep. 14-17, 1999, (pp. 2113-2120).

Van Dyke, Karen L., "The World After SA: Benefits to GPS Integrity", © 2000 IEEE, (pp. 387-394).

Young et al., "Fault Detection and Exclusion Using Normalized Solution Separation and Residual Monitoring Methods", *Navigation: Journal of The Institute of Navigation*, vol. 50, No. 3, Fall 2003, (pp. 151-169).

U.S. Patent Application No., filed Jun. 29, 2005, entitled "Integrity-Optimized Solution Separation Method for Inertially-Aided Aircraft Autonomous Integrity Monitoring", (25 pages & 8 sheets of drawings).

\* cited by examiner

SLOPE PLOT FOR 6-SATELLITE EXAMPLE-UNIFORM WEIGHTS

SLOPE PLOT FOR 6-SATELLITE EXAMPLE- NON-UNIFORM WEIGHTS

Scatter plot for 6-satellite example – Uniform Weights

FIG. 3

Scatter plot for 6-satellite example – Non-Uniform Weights

FIG. 4

UPPER BOUND REPRESENTATION OF MISSED DETECTION IN P-E SPACE

FIG. 6

BIVARIATE GAUSSIAN PARAMETERS IN P-E SPACE

○ Standard RAIM-FDE
● NIORAIM

Table Lookup HIL less Monte Carlo HIL scatter plot (magnified version of FIG. 10)

INTEGRITY-OPTIMIZED RECEIVER AUTONOMOUS INTEGRITY MONITORING (RAIM)

CROSS-REFERENCE TO RELATED PATENT APPLICATIONS

This application is related to U.S. patent application Ser. No. 11,170,665 entitled Integrity-Optimized Solution Separation Method for Inertially-Aided Aircraft Autonomous Integrity Monitoring, filed on the same day herewith incorporated by reference in its entirety.

BACKGROUND

A major shortcoming of Receiver Autonomous Integrity Monitoring (RAIM) Fault Detection and Exclusion (FDE) is widely recognized to be it occasional lack of availability, in the sense that the integrity level it can protect in any given situation cannot always be smaller than the required alert limit for a given flight operation. Ever since the RAIM FDE algorithms were developed, accepted and published more than ten years ago, the system availability has been bound, by and large, to the limitations of its monitoring mechanism to be able to detect and exclude a single measurement fault. There have been many studies made on evaluating the system availability, usually on a global basis, and they have considered various assumptions of constellation size, horizon mask angle, and aiding with baro-altitude, inertial, and additional non-GPS satellites, or even with Loran. In all of these studies, however, the basic shortcomings of RAIM FDE remained essentially bound by its theoretical limits. More recently, there has been a proposition that departs from conventional assumptions made in the standard RAIM-FDE by better balancing accuracy and integrity levels. This proposition results in the lowering of the horizontal integrity limit for all satellite measurement geometries, thereby improving system availability in the process.

Accordingly, there is a need for a methodology called Novel Integrity Optimized RAIM (NIORAIM) for accomplishing the balancing of position accuracy with integrity. Further, there is a need for a design that is a NIORAIM amenable to real-time computation.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is an integrity monitoring method. The method comprises determining a set of non-uniform weights based on a least squares approximation of a linearized measurement equation. The method also comprises applying the non-uniform weights in a receiver autonomous integrity monitoring (RAIM) system. Further, the method comprises determining a reduced integrity limit based on the output of the RAIM system.

What is also provided is an integrity monitoring system for an aircraft. The integrity monitoring system comprises a weight generation subsystem. The weight generation subsystem generates a set of non-uniform weights based on a least squares approximation of a linearized measurement equation. The system also comprises a receiver autonomous integrity monitoring subsystem applying the set of non-uniform weights. Further, the system comprises a horizontal integrity limit subsystem generating a reduced horizontal integrity limit based on the output of the RAIM subsystem.

Further, what is provided is an integrity monitoring system. The integrity monitoring system comprises a means for determining a set of non-uniform weights based on a least squares approximation of a linearized measurement equation. The integrity monitoring system also comprises the means for applying the non-uniform weights in a receiver autonomous integrity monitoring system. Further, the integrity monitoring system comprises a means for determining a reduced integrity limit based on the output of the RAIM system.

Alternative examples and other exemplary embodiments may also be provided which relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 1:
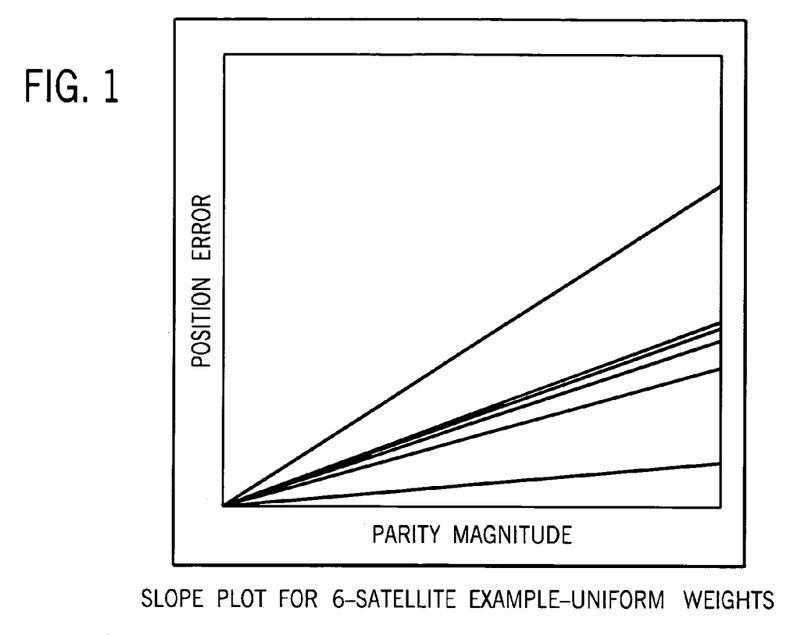
FIG. 1 is an exemplary graph of parity magnitude versus position error for a 6-satellite example with uniform weights.
Figure 2:
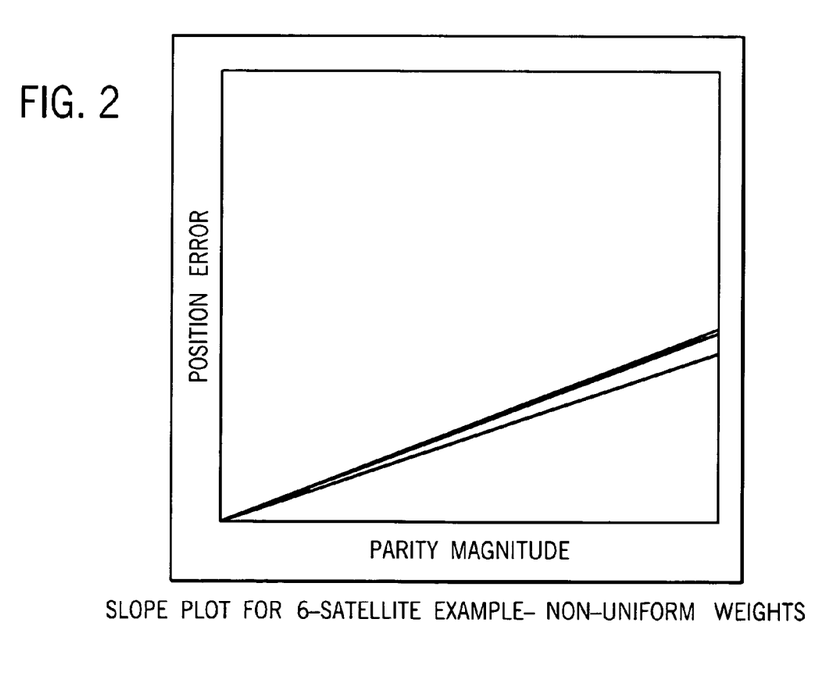
FIG. 2 is an exemplary graph of parity magnitude versus position error for the 6-satellite example of FIG. 1 with non-uniform weights.

To demonstrate the general approach of NIORAIM, an illustration involving the Slope is depicted in FIG. 1 and FIG. 2, one of the more lucid graphical concepts available. Under noiseless conditions, the slope associated with a fault on one particular satellite represents the sensitivity of position solution error to that fault. Of all the slopes associated with the different satellites, only the largest slope matters, since the worst-case satellite must be accommodated. FIG. 1 shows a typical example of such a situation (based on a 6-satellite geometry). With NIORAIM, by deliberately combining the measurements differently through the use of non-uniform weighting, it is possible to facilitate a rearrangement of the slopes such that they are more nearly balanced. In doing so, the worst-case slope can end up being smaller than its counterpart in the original scheme (see FIG. 2). The penalty for achieving this is that the position solution computed from this contrived non-uniform set of weights is no longer optimal. However, it has long been recognized that the solution accuracy for RAIM-FDE has been much better than necessary in many aviation and other applications where the integrity limit is more relevant. Thus, there is sufficient headroom to give up some solution accuracy for the benefit of improving the integrity availability.

In general, the NIORAIM algorithm with non-uniform weights is more complex than the original RAIM algorithm, particularly in the area of computing the integrity limits when the measurement noise is nontrivial. Accordingly, a design that is still amenable to real-time computation is described.

Suboptimally-Weighted Solution and the Test Statistic

An analysis of weighted least-squares with the basic linearized measurement equation where there may be an overdetermined system of linear equations is begun with:

$$z = Hx + \epsilon \quad (1)$$

where z is the measurement, H providing the idealized linear connection, and x is the unknown state vector, and $\epsilon$ is the measurement error vector. Assume, as is usual in the RAIM problem after normalization for possible unequal measurement variances, that the random elements of $\epsilon$, as shown in Eq. (1) are uncorrelated and have equal variances.

The weighted least-squares estimate is then:

$$\hat{x}_{WLS} = (H^T V H)^{-1} H^T V z \quad (2)$$

Assume V to be diagonal in this analysis, and the square root of V describes the weights given to the measurements, i.e., $$V = w w^T \quad (3)$$

where w is the square matrix containing positive weights along the diagonal. Of course, the estimate given by Eq. (2) reduces to the usual optimal least-squares estimate when all the elements of w (or V) are equal. Otherwise, the estimate is suboptimal. Of primary interest here is the suboptimal estimate.

The test statistic will be the usual parity vector, and it is formed by $$p = Pz \quad (4)$$

where P is the parity transformation matrix associated with H.

In summary, assume that the estimate and test statistic are given by the combined matrix equation:

$$\begin{bmatrix} \hat{x}_{WLS} \\ P \end{bmatrix} = \begin{bmatrix} (H^T V H)^{-1} H^T V \\ P \end{bmatrix} z \quad (5)$$

It is easily verified by noting that P is orthogonal with H orthogonal with H that the estimation the estimation error of x and parity vector p are related to $\epsilon$ through the equations:

$$e = \hat{x}_{WLS} - x = (H^T V H)^{-1} H^T V \epsilon \quad (6)$$

or $$e = \underbrace{((wH)^T (wH))^{-1} (wH)^T}_{A_w} (w\epsilon) \quad (7)$$

and $$p = P\epsilon \quad (8)$$

It is important to note that e and p are functions of $\epsilon$ alone (and not x), and this is as it must be in the RAIM problem.

Also, considering just the random part of e and p, it is easily verified that the covariances are given by the equations:

$$\text{Cov}(e) = \sigma^2 A_w w w^T A_w^T \quad (9)$$

$$\text{Cov}(p) = \sigma^2 P P^T = \sigma^2 I_{(n-4)} \quad (10)$$

where n is the number of measurements and $\sigma^2$ is the variance of the noise components of $\epsilon$.

Figure 3:
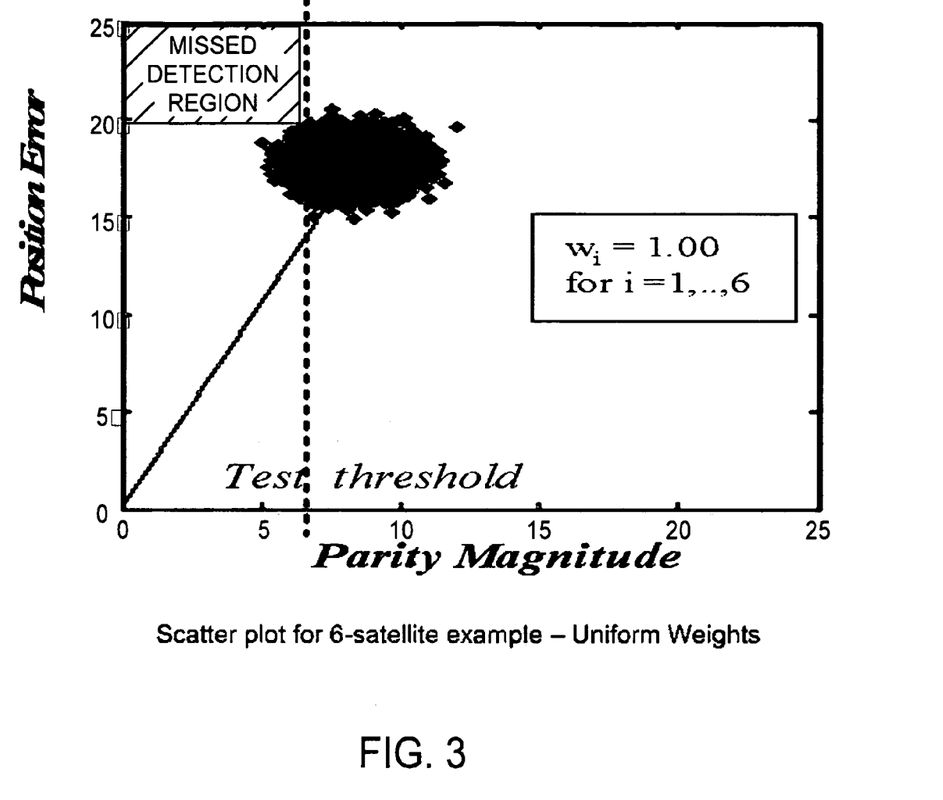
FIG. 3 is an exemplary graph of parity magnitude versus position error for a 6-satellite example using unity weights.
Figure 4:
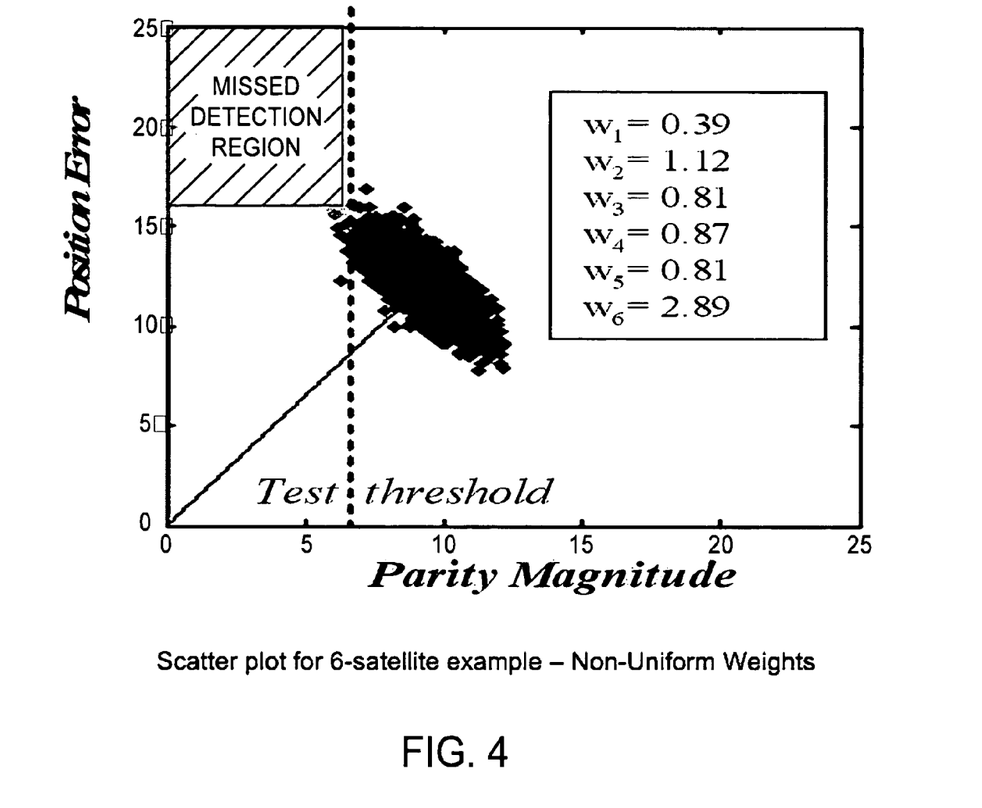
FIG. 4 is an exemplary graph of parity magnitude versus position error for a 6-satellite example using non-uniform weights.

The presence of w in the x-error equation, Eq. (7), complicates the weighted RAIM analysis considerably. Forming the cross-covariance between p and e, in general, all the components of p and e are mutually correlated. This causes the scatter plot of the horizontal position error versus the norm of p (i.e. the detection test statistic) to be skewed as shown in FIG. 4. Whereas, in the uniform weight case, the mutual correlations among the p and e components are all zero (see FIG. 3). This simplifies the RAIM analysis considerably.

In view of the previous discussion, and noting that the parity vector and associated parity space are invariant with the weights, one might logically ask, "From whence comes the RAIM improvement?" The answer is this: by judicious choice of w, the deterministic position error caused by the bias on the most-difficult-to-detect satellite can be reduced significantly. This, in turn, reduces the slope line for that particular satellite, and thus the horizontal integrity limit (HIL) is lowered accordingly. This is done at some expense in terms of rms error due to noise, but this may be acceptable for improved availability. It is also worth mentioning that the foregoing remarks apply only to the detection half of RAIM. If the parity method is used for identification, then the identification half of our proposed NIORAIM is not affected by the choice of weights.

Reducing the Horizontal Integrity Limit

The true benefit of the NIORAIM scheme is in lowering the horizontal integrity limit. The horizontal integrity limit is evaluated in the parity-(position)error space. In this space, a distribution of noisy data traverses along a "slope" line associated with a fault as the fault progresses on a particular satellite. In FIGS. 3 and 4, it is the upper left quadrant (shaded) that represents samples of missed detection, the occurrence rate of which must be held to the specified standard of $10^{-3}$ or less. The integrity limit is obtained by evaluating each and every satellite and taking the one that yields the largest value representing the worst-case satellite fault.

In RAIM, the worst case satellite is generally associated with the largest slope. To account for the noise scatter, additional adjustments were needed in the usual RAIM, but this was relatively uncomplicated because the noise scatter distribution is uncorrelated between its two dimensions of parity and error. The same is not true, in general, for NIORAIM as a result of the nonuniform measurement weighting (note the skewed ellipticity in FIG. 4).

The cross-covariance between the parity and the position error vectors, from Eqs. (6) and (8), may be formed as $$\text{Cov}(p, e) = E(pe^T) = PE(\varepsilon\varepsilon^T)[(H^T V H)^{-1} H^T V]^T = \sigma^2 P V^T H (H^T V H)^{-1}$$

since $E(\varepsilon\varepsilon^T) = \sigma^2 I$.

For the original RAIM, where V=I, Cov(p, e)=0 because P is orthogonal with H. For NIORAIM in general, Cov(p, e)≠0. As a result, with NIORAIM, the approximations conceived to evaluate the integrity limit for RAIM are far less useful. Accordingly, three alternative methods of evaluating the integrity limit are described.

Possible Methods for Evaluating the Horizontal Integrity Limit (HIL)

Figure 5:
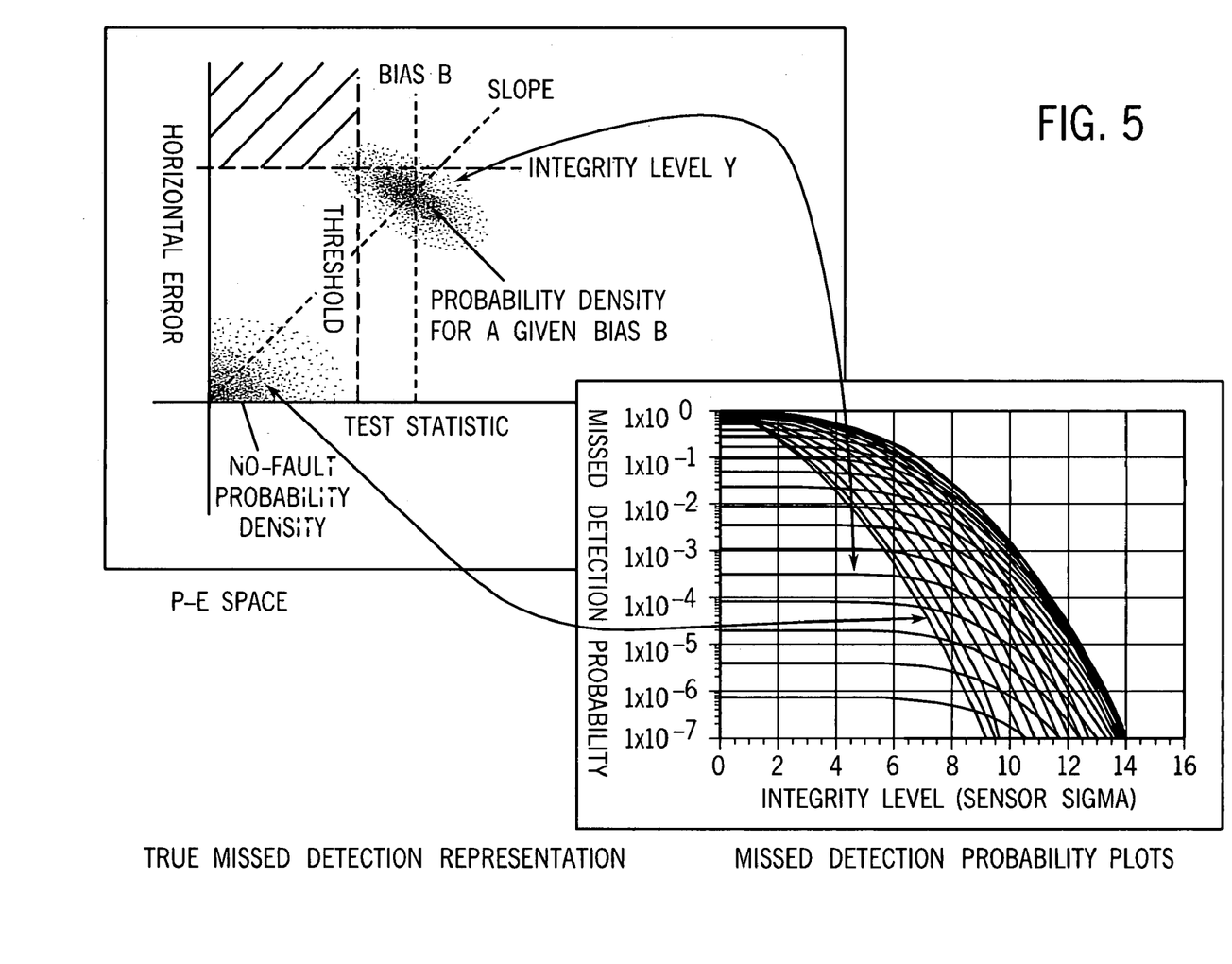
FIG. 5 is an exemplary representation of true missed detections.

(a) Monte Carlo:

This is simply a "brute-force" exercise in running a massive number of randomly-generated measurements while simulating a varying-size fault and counting the samples that fall within the missed detection quadrant to establish the Integrity Level Y (see FIG. 5a). More generally, for a given level of fault, if the sample distribution in frequency bins were each bin contains all samples whose horizontal error is less than Y are counted, then this probability of missed detection rolls off as Y increases. If this is repeated for different sizes of faults, a group of curves that resemble FIG. 5b results. The outer envelope of this collection of curves represents the worst-case situation that must be taken into consideration. The level where this outer envelope rolls off to $10^{-3}$ is the integrity level we can protect to $10^{-7}$ (assuming an unconditional $10^{-4}$ fault rate).

Note, from FIG. 5b, that the no-fault case already belongs to this collection of curves and thus obviates any need to separately evaluate a No-Fault HIL. While a rigorous fault-free analysis might insist on parsing out such a no-fault component, it may be considered combined with the usual HIL here.

While this Monte Carlo method may be too computationally taxing for real-time processing, it is straightforward and defensible, and useful for offline validation purposes.

Figure 6:
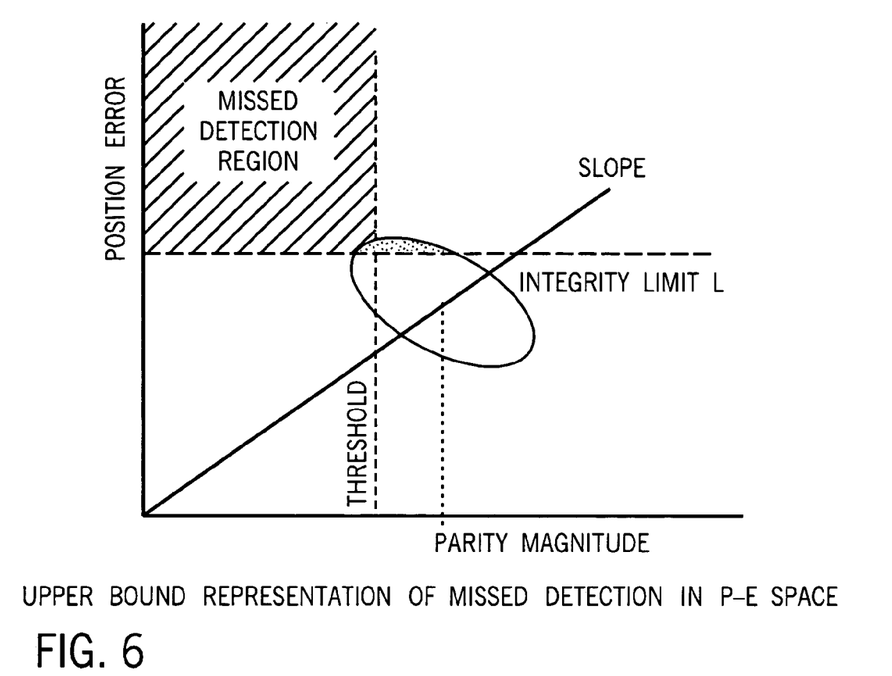
FIG. 6 is an exemplary graph of an upper bound representation of missed detection in the parity magnitude position error space.

(b) Upper Bound:

A more analytical alternative to determining the integrity level may be to compute a conservative upper bound for it. The missed detection probability is to be contained not just within the upper left quadrant, but within both the upper left and upper right quadrants (shaded region of distribution in FIG. 6). By the inclusion of a larger region, the integrity level needed to satisfy the missed detection probability of 0.001 will tend to be larger as a result, hence its upper bounded characteristic. In assuming this level, it is assured that the portion that resides in the missed detection region will be no more than 0.001, and almost assuredly even less than that.

It may also be desirable to consider the nontrivial correlation that exists between the parity and error variates. A correlation to a first-order approximation may be established. First, the angle of the ellipse in FIG. 6 must be derived.

This approach, while quite amenable to real-time processing, produces somewhat pessimistic results. Therefore, another alternative that proves to be quite practical, once validated may be applied.

Figure 7:
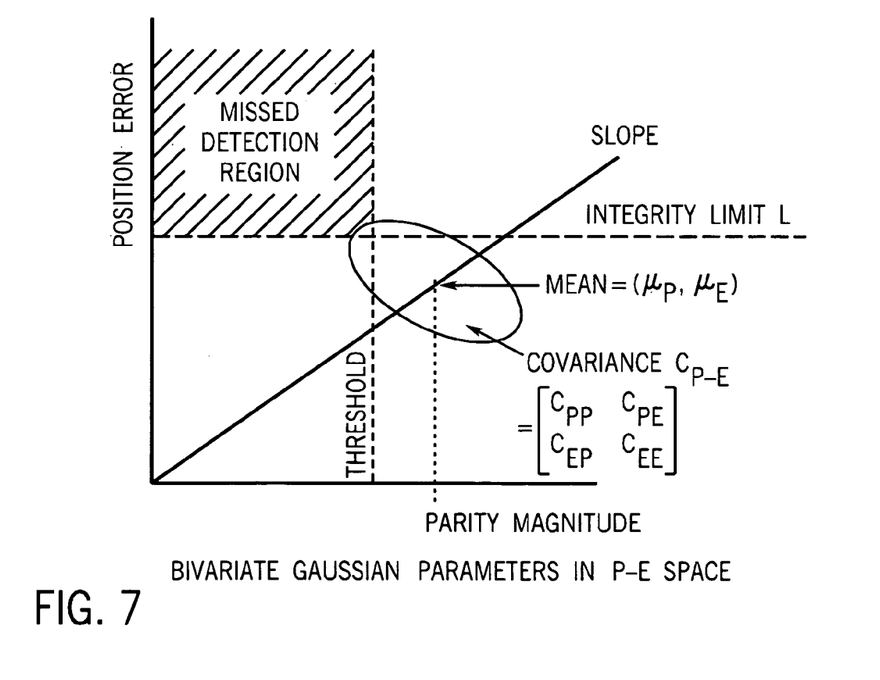
FIG. 7 is an exemplary graph of a bivariate Gaussian parameters and parity magnitude position error space.

(c) Lookup Table:

The notion of a lookup table conjures the idea of some compromise between rigorous computation that has to be computed and validated offline, so that this table can be referenced online with minimal processing. Every lookup table requires a definition of the set of parameters that would fully describe the relevant operating conditions. To simplify this aspect of the lookup table, it may be assumed that the distribution is, to a first-order approximation, bivariate Gaussian (see FIG. 7). This assumption permits a reduction in the parameter set down to the following:

1. Number of satellites (affects the Threshold);
2. Variance of the Error dimension $c_{EE}$ of the bivariate Gaussian distribution;
3. Correlation coefficient of the bivariate Gaussian distribution (related to $c_{PE}$);
4. Slope of the mean of the bivariate Gaussian distribution.

The computation of the covariance matrix $C_{P-E}$ is derived in the Appendix. After the normalized transformation in the parity space, the term $c_{PP}=1$, thus only the $c_{PE}$ and $c_{EE}$ terms of the covariance matrix need be calculated. Using this approximation for computing the missed detection probability, it may be desirable to proceed to compute the integrity limit by following the same philosophy as outlined previously for the Monte Carlo approach, i.e. determine the worst-case envelope where it intersects the $10^{-3}$ probability threshold.

In offline processing, the integrity limit may be computed for a set of cardinal points of a 4-dimensional array that represents the lookup table. In online processing, an interpolation process among the appropriate neighboring cardinal points may be carried out to compute the integrity limit.

Note that the mean of the bivariate Gaussian distribution does not have to be dealt with as two separate parameters ($\mu_P$ and $\mu_E$) because their connection through the slope as the distribution ascends in the presence of a growing fault is already accounted for in considering the worst-case situation when evaluating the Integrity Limit L. Thus, the four parameters chosen represent a limited set to consult in the Lookup Table.

Search for Optimized Weights

Methods for seeking a weighting matrix that would optimize the integrity limit is described.

(a) Monte Carlo Approach

In a Monte Carlo approach, the different values of the diagonal weighting matrix w are randomized, the resultant integrity limit is evaluated, and this is repeated for a large number of trials, ultimately choosing the set of weights that yield the lowest integrity limit. The success of finding a good set of weights yielding the lowest integrity limit depends considerably on the sample size since its performance is ultimately statistical in nature. This approach is quite computationally intensive because of the dimensionality of w.

(b) Iterative Search

A more efficient search may well be based on any one of numerous methods available from the catalog of optimization science, but they all face the difficulties and challenges of what amounts to solving a global optimization problem with multiple local extrema. What may be more valuable is an ad hoc iterative search method that is straightforward and appears to do a reasonably good job of producing a solution that is close to the optimum.

An initial search point may be chosen as unity weights. With each iteration, the following is computed: (a) the variance of the random position error, (b) correlation coefficient of the bivariate distribution in the parity-position scatter plot, and (c) slopes for each of the satellites in the measurement suite (see the Appendix for details). Using Items (a), (b) and (c) as input parameters to the Lookup Table, the horizontal integrity level $L_i$ for the various satellites in the suite (with appropriate interpolation of the discrete values in the table) is determined. A new set of weights in the iteration procedure is computed according to the equation:

$$w_i(k+1) = \left(\sqrt{\frac{\gamma}{L_i}}\right)^{\frac{1}{n}} w_i(k) \text{ for } i = 1, \ldots, n$$

where n=number of measurements and $$\gamma = \left(\prod_{i=1}^{n} L_i\right)^{\frac{1}{n}}$$

($\gamma$ is a geometric mean of the set of $L_i$ for n satellites).

Heuristically, a larger protection level $L_i$ for a given satellite i will lead to a reduction in the associated weight for the next iteration. Clearly, the most-difficult-to-detect satellite at the start of the process (one with the largest $L_i$) will gradually become deweighted as compared to other satellites. Eventually, the protection levels will become more nearly equal to one another. With that, any large disparity in one particular satellite having a $L_i$ being distinctly larger than the rest, thereby making the most-difficult-to-detect by far, would then be eliminated.

Extension of Search

In each search, it may be desirable to terminate the iterative process when the integrity limit (the largest of the $L_i$'s) had reached a relative minimum. In most cases, the integrity limit decreases monotonically to a point where it would start to increase again. It may be desirable to choose the lowest value as satisfying the termination criteria. In order to avoid rare pathological conditions early on in the iterative search, it may be desirable not to invoke the termination criterion until after five steps. However, this set of weights calculated in this way may not yet be the absolute lowest achievable limit. While this iterative method goes a long way in converging close to the best solution quite rapidly and reliably, the solution may be refined in other ways, either with a small Monte Carlo search in the neighborhood of the candidate solution or with other optimization methods to home in on the nearest local minimum, etc.

Unavailable Satellite Geometries

The ultimate utility of NIORAIM lies in improving on the overall availability that can be obtained with the standard RAIM-FDE. This availability is generally assessed in offline simulations by varying the satellite geometry as a function of time and observer location.

In a typical analysis conducted with tools developed for standard RAIM-FDE at Rockwell-Collins, Inc. of Cedar Rapids, Iowa, to certify system availability performance of its commercial avionics GPS receiver products, the following availability rates were obtained (this assumes an absence of selective availability, and visibility of satellite down to 2° above the horizon).

TABLE 1(a)

RAIM availabilities - fault detection only

| Phase of flight | GPS w/o baro-aiding | | GPS w/baro-aiding | |
|---|---|---|---|---|
| | # not avail | Avail % | # not avail | Avail % |
| Oceanic Remote | 13 | 99.9968 | 0 | 100 |
| Terminal Area | 30 | 99.9903 | 0 | 100 |
| Non-Precision Approach | 334 | 99.8924 | 8 | 99.9974 |

TABLE 1(b)

RAIM availabilities - fault detection and exclusion

| Phase of flight | GPS w/o baro-aiding | | GPS w/baro-aiding | |
|---|---|---|---|---|
| | # not avail | Avail % | # not avail | Avail % |
| Oceanic Remote | 2395 | 99.2282 | 67 | 99.9784 |
| Terminal Area | 5033 | 98.3781 | 244 | 99.9214 |
| Non-Precision Approach | 20409 | 93.4232 | 4127 | 98.6701 |

The results provided here focus primarily on the fault detection and exclusion requirements for non-precision approach (NPA) and including the use of baro-aiding (shaded cells in Table 1b). To evaluate NIORAIM, it is beneficial to focus primarily on determining how many of these "unavailable" cases can be salvaged.

Description of the "Unavailable" Cases

Each case, representing a collection of visible satellites observed at a space-time point, had been evaluated in a series of checks. First, the pre-fault detection may be tested using all available satellites. If the HIL meets the alert limit requirement, fault exclusion is tested. If each and every satellite can be uniquely identified should it fail, the post-fault detection of each of the satellite subsets that must operate without the failed satellite is assessed. To pass this test, the HIL of all these subsets must meet the alert limit requirements.

If a particular satellite, should it fail, cannot be uniquely identified to a confidence level of better than 99.9%, we would attempt to exclude both that satellite together with the second satellite instigating the uncertainty in identification. If we can successfully exclude these two satellites, the subset of remaining satellites would be evaluated for post-fault detection to determine if it can meet the required alert limit. If these tests are not satisfied, the particular satellite geometry is deemed "unavailable". Each of these "unavailable" cases can be placed in one of four different categories:

A. Cannot pre-fault detect:

The HIL exceeds the NPA alert limit of 555.6 meters with all the satellites;

B. Cannot post-fault detect following single satellite identification:

The attempt to isolate the worst-case satellite succeeded but the HIL of the remaining satellites exceeds the NPA alert limit in the post-fault detection test;

C. Cannot post-fault detect following dual-satellite exclusion:

The attempt to isolate the worst-case satellite failed but the attempt to exclude the worst-case satellite and the satellite with the characteristic vector closest to the former succeeded; however, after excluding the two satellites, the HIL of the remaining satellites exceeded the NPA alert limit in the post-fault detection test;

D. Cannot exclude two satellites where needed:

The attempt to exclude one or two satellites failed, implying the complication involving a third satellite; no attempt is made to exclude three satellites because the remaining subset of satellites is unlikely to be useful anymore.

In each case, the H matrix contains the direction cosines of the visible satellites and the last row of the H matrix, [0 0 0.24 0], corresponds to the baro measurement. The third component associated with the vertical is the reciprocal of the ratio of the baro-altitude error to the GPS pseudorange error. Assume the former to be 50 meters and the latter to be 12 meters.

Availability Results Comparison of RAIM and NIORAIM

In running the conventional RAIM-FDE tool in an exemplary text, for fault detection and exclusion with baro-aiding, 4127 "unavailable" cases were identified. These cases were broken down into the different types of categories described above according to the number of occurrences for each (see shaded column in Table 1b).

The results in Table 2 show that the number of "unavailable" geometries can be reduced significantly with NIORAIM. NIORAIM did little for Category A cases. A few of the eight geometries were actually salvaged at the pre-fault detection test, but these failed altogether at the post-fault detection test. A large number of geometries were salvaged in Category B by NIORAIM—more than 92% of the 2,218 geometries. The salvaged geometries passed the post-fault detection test where they had failed before with the standard RAIM-FDE.

As for the other two categories, C and D, recall that NIORAIM does nothing to improve the exclusion process for the given geometry. Given this, Category D remains unsalvageable. Even Category C exhibited very little improvement—only 8 cases out of 1809 were salvaged—because the exclusion of two satellites invariably degraded the conditions so substantially that even NIORAIM could not salvage them. The need to correctly exclude a fault to better than 99.9% confidence is something imposed under the current TSO rules. However, with the added test for post-fault detection of the remaining satellites, there may be some room to puzzle over the need, not for exclusion, but rather its rigid requirement against misidentification. Hypothetically, if the cases of Category C were unburdened by the need to exclude two satellites, the number of cases that can be salvaged by NIORAIM is 653 out of 1809, about 36% of Category C (entries with asterisk * in Table 2). The number of cases that can be salvaged by NIORAIM in Category D, with the same assumption, is far less significant—only 5 out of 92. Ultimately, bound by current TSO rules, only 2066 (from Category B and C) out of 4127, or about 50% of all the cases involved.

Figure 8:
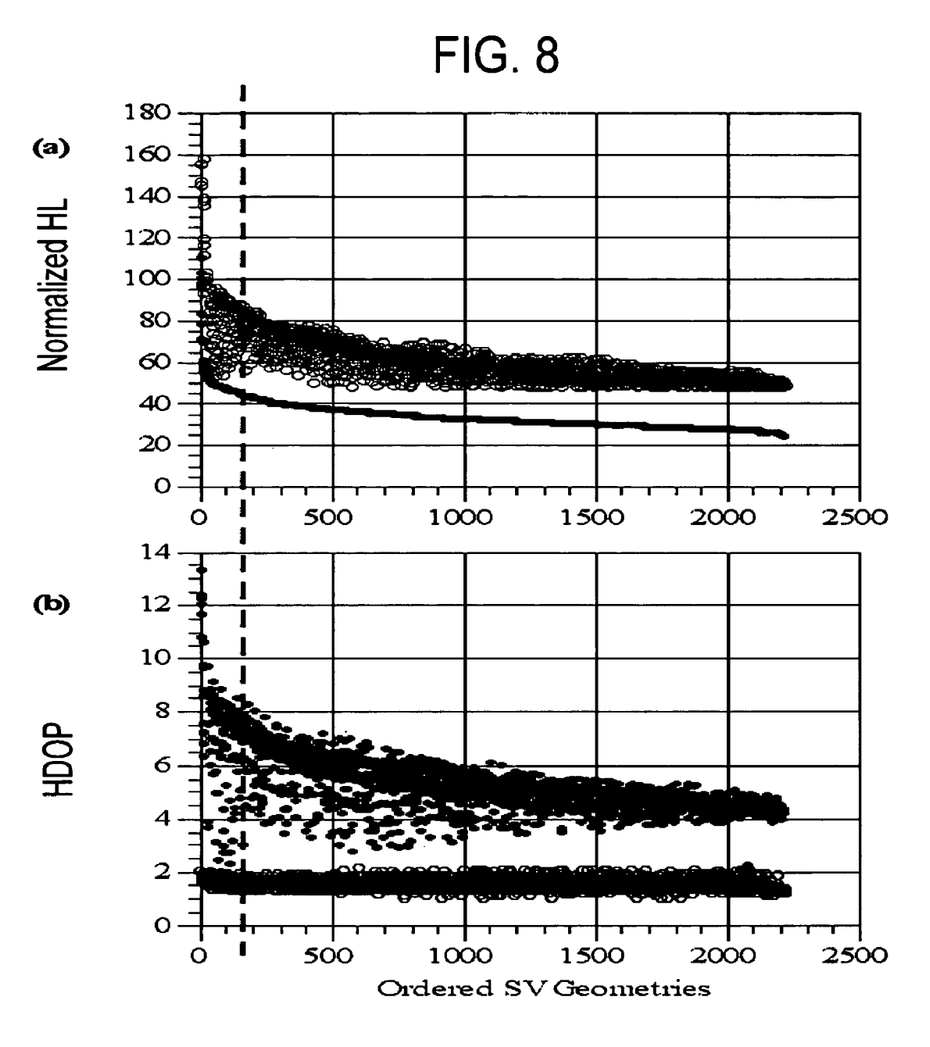
FIG. 8 is an exemplary graph of ordered SV geometries versus normalized horizontal integrity limit.

Taking a closer look at the cases from Category B, by comparing standard RAIM-FDE with NIORAIM, the plots of FIG. 8 show that NIORAIM lowers the Normalized HIL by roughly 15-40 units (of the range error$\sigma$) over standard RAIM-FDE. The cases shown were arranged according to the Normalized HIL for NIORAIM in descending order (making the NIORAIMcurve in FIG. 8 look noiseless as a result). Using a noise $\sigma$=12 m, the NPA alert threshold is at about 46 units (equivalent to 555.6 m). The dashed line intersects the Normalized HIL plot for NIORAIM signifying that all satellite geometries in this set to it left are not salvageable, while those to its right are.

Figure 9:
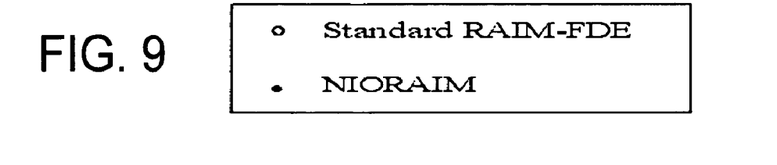
FIG. 9 is an exemplary graph of ordered SV geometries versus HDOP.

At the same time, FIG. 9 shows that NIORAIM gives up horizontal solution accuracy with an HDOP of roughly 5-10 as compared with an HDOP of less than 2 for standard RAIM-FDE. The ordering of the cases shown in FIG. 9 is the same as that shown for FIG. 8. We can see from FIG. 9 that the largest HDOP seen in the set of salvageable data found to the right of the dashed line is about 8.5.

To determine if a given geometry is "available", the Lookup Table HIL was compared to the NPA Alert Limit of 555.6 m. As reasoned in the next section titled *Validation of the Lookup Table HIL*, a 15-m adjustment to the Lookup Table HIL was made in order to be conservative (a detailed justification is discussed in the next section). In most cases so determined, the Lookup Table HIL value was kept as it was but the Alert Limit threshold was lowered to 540.6 m for the comparison.

TABLE 2

Comparison of results for Standard RAIM and NIORAIM

| "Unavailable" Category | Using Standard RAIM-FDE "Unavailable" with RAIM-FDE | Using NIORAIM "Unavailable" Using Lookup Table HIL | |
|---|---|---|---|
| A. Cannot pre-fault detect | 8 | 8 | |
| B. Cannot post-fault detect following single satellite identification | 2218 | 160 | |
| C. Cannot post-fault detect following dual-satellite exclusion | 1809 | 1156* | 1801 |
| D. Cannot exclude two satellites where needed | 92 | 87* | n/a |

*Assumes the satellite fault can be uniquely identified by successive post-fault detections.

Validation of the Lookup Table HIL

A simple evaluation of the Lookup Table HIL approach was conducted by comparing it to one derived from a Monte Carlo approach. For each "unavailable" satellite geometry scenario, a set of weights was computed to obtain the lowest HIL based on the Lookup Table approach. Then, for that particular set of weights, a Monte Carlo run was made with 100,000 random samples and tested with a discrete-step incrementing fault to determine the HIL that yields a $10^{-3}$ missed detection probability.

The lookup table was constructed as a four-dimensional array with the four parameters used in the lookup scheme being:

a) Number of satellites n from 5 to 9;

b) Log $\sqrt{c_{EE}}$, in steps of 0.1 from −0.4 to 1.0, where $c_{EE}$ is the variance of the position error from the P-E covariance matrix;

c) Correlation coefficient $$\rho = \frac{c_{PE}}{\sqrt{c_{EE}}}$$

from −1.0 to 1.0 in steps of 0.2;

d) Slope of the satellite fault bias, s from 1.0 to 12.0 in steps of 1.0;

The resulting table array contains 5×15×11×12 elements. Note that the chosen range for the slope component restricts its usefulness of generating HIL values mostly for NPA, and that range may have to be extended for other phases of flight. For a given number of satellites n, the remaining three parameters [$\log_{10}\sqrt{c_{EE}}$, $\rho$, s] are extracted, the eight neighboring elements of the table were used to linearly interpolate to obtain the appropriate value for the HIL.

Figure 10:
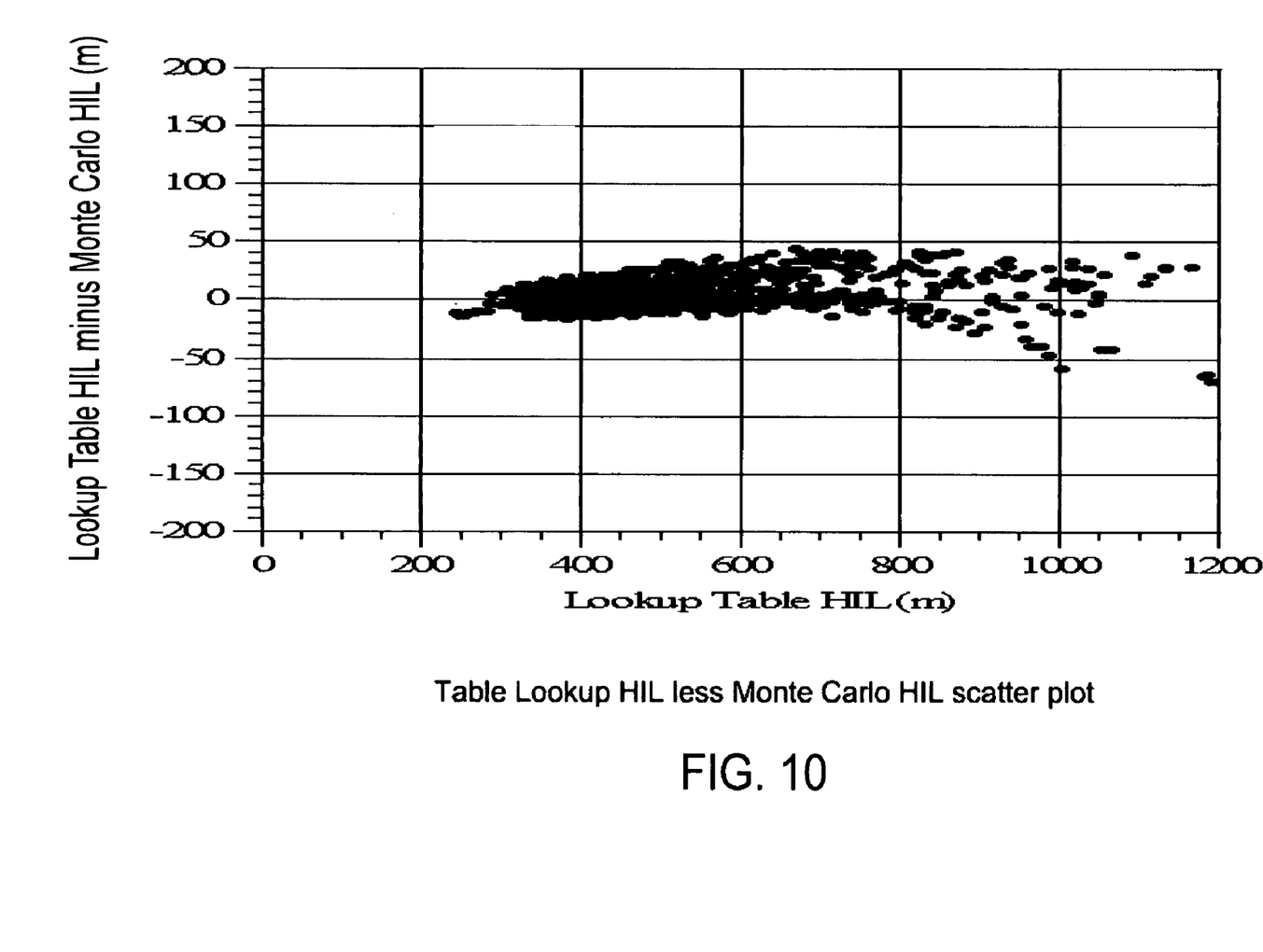
FIG. 10 is an exemplary diagram of lookup table horizontal integrity limit versus lookup table horizontal integrity limit minus the Monte Carlo horizontal integrity limit.

To evaluate the consistency between the Lookup Table HIL as compared to the Monte Carlo HIL, the difference between the two HIL values for each satellite geometry scenario were formed. Then, this difference was plotted against the Lookup Table HIL value. This plot shows a narrow scatter in the difference between the two HIL's, but there is a correlation between this difference and the absolute size of the HIL's. In the plot of FIG. 10, a scatter of points that ranges roughly over ±15 m can be seen but the mean of this scatter clearly varies roughly linearly from about zero to about 20 m when the HIL is at 700 m or so, and then it curves downwards beyond that. That lookup table covers a domain of cardinal points that yield HIL's of up to about 1200-1600 m.

For the HIL cases that are larger than this, the lookup table will extrapolate beyond the available cardinal points instead of interpolate between them. As a result, the Lookup Table. HIL estimate will likely be in error by a larger amount. It should be obvious that the discrepancy between the Lookup Table HIL and Monte Carlo HIL becomes exacerbated beyond about 1100 m.

Figure 11:
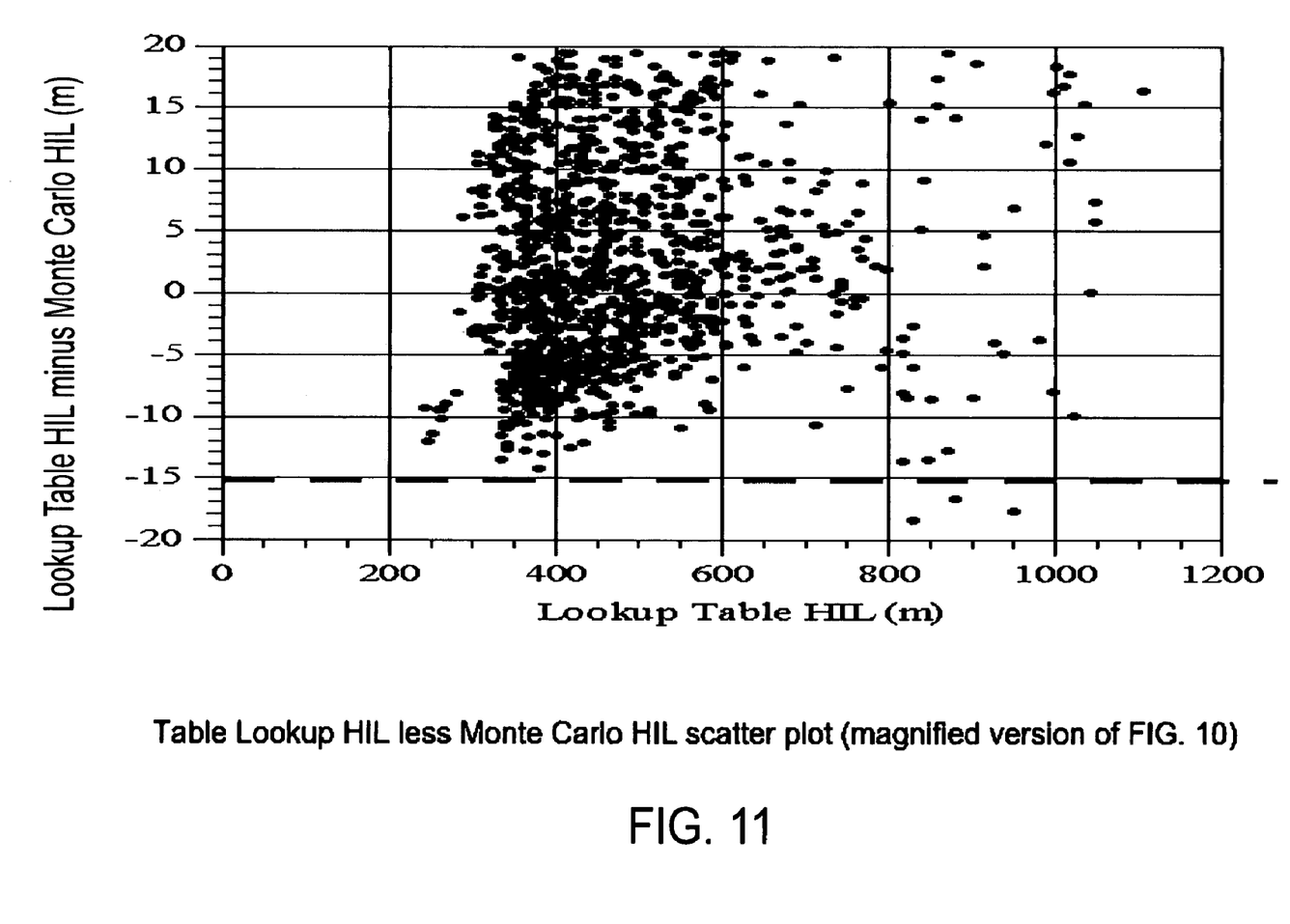
FIG. 11 is a magnified version of FIG. 10.

To be conservative, it may be preferable for all relevant data points in FIG. 10 to be equal or greater than zero. That would imply that the Lookup Table HIL is no smaller than the true HIL (as represented by the Monte Carlo HIL). It is apparent from FIG. 11 (which is simply a magnified plot of FIG. 10) that this can be achieved by adding a 15-meter bias to the Lookup Table HIL. Data points beyond 800-m for the Lookup Table HIL are irrelevant because they would already be rejected for being larger than the 555.6 meter alert limit needed to meet NPA.

The Lookup Table used for the evaluations presented here appears to be more than adequate in handling availability evaluations associated with Non-Precision Approach where the alert limit is 555.6 m. For operational evaluations associated with higher alert limits, the Lookup Table needs to be extended, particular in the dimensions of $c_{EE}$ (in the form of $\log_{10}\sqrt{c_{EE}}$) and slope. Currently, the upper end of the ranges for both are $\log_{10}\sqrt{c_{EE}} \leq 1.0$ (or $c_{EE} \leq 100$) and slope $s \leq 12$. The correlation coefficient currently ranges from −1.0 to 1.0 in incremental steps of 0.2.

CONCLUSIONS

A novel modification to the standard RAIM-FDE algorithm called NIoRAIM has been presented together with results to demonstrate its capability to improve the horizontal integrity limit for any given satellite scenario. Clearly, the improvement in HIL comes at the expense of solution accuracy, an acceptable tradeoff to achieve lower integrity limits. In a particular worldwide availability assessment at alert limits for the NPA phase of flight, using baro-aiding, NIoRAIM was able to salvage about 50% of the geometries previously rendered "unavailable" by the standard RAIM-FDE.

The general philosophy behind NIoRAIM is straightforward and sound, though seemingly counterintuitive at first—by deweighting satellite measurements that are more error sensitive to a yet-to-be-detected fault, we would also lower the total error at the time of detection. This philosophy can be applied to any RAIM-type algorithm involving vertical protection, speed protection, etc., and to other equivalent integrity monitoring methods such as solution separation as well.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

APPENDIX

In the two-dimensional Parity-Error space, in the presence of a fault, the sample statistical distribution moves up a slope line. The further its rise, as determined by the size of the fault, the more the distribution resembles a bivariate Gaussian. This approximation is useful for simplifying the Lookup Table HIL approach described earlier. Here, we will derive the covariance matrix of this bivariate Gaussian distribution:

$$C_{P-E} = \begin{bmatrix} c_{PP} & c_{PE} \\ c_{PE} & c_{EE} \end{bmatrix}$$

For any two-dimensional distribution offset by a bias, we can form the following approximation.

$$e = \sqrt{(X_0 + \Delta x)^2 + (Y_0 + \Delta y)^2}$$
$$= \sqrt{(X_0^2 + Y_0^2) + 2X_0\Delta x + 2Y_0\Delta y + (\Delta x^2 + \Delta y^2)}$$

Then, assuming $(\Delta x^2 + \Delta y^2) \ll (X_0^2 + Y_0^2)$, $$e \approx \sqrt{(X_0^2 + Y_0^2)} \cdot \sqrt{1 + \frac{2X_0\Delta x}{(X_0^2 + Y_0^2)} + \frac{2Y_0\Delta y}{(X_0^2 + Y_0^2)}} \approx$$

$$R_0\left(1 + \frac{X_0\Delta x}{(X_0^2 + Y_0^2)} + \frac{Y_0\Delta y}{(X_0^2 + Y_0^2)}\right), \text{ for small } \Delta x, \Delta y$$

Or, $$e \approx R_0 + \frac{X_0\Delta x}{\sqrt{X_0^2 + Y_0^2}} + \frac{Y_0\Delta y}{\sqrt{X_0^2 + Y_0^2}} = R_0 + \frac{1}{R_0}[X_0 \quad Y_0]\begin{bmatrix}\Delta x \\ \Delta y\end{bmatrix}$$

where
  e=magnitude of total error
  $\Delta x, \Delta y$=components of random error
  $X_0, Y_0$=components of fixed bias $$R_0 = \sqrt{X_0^2 Y_0^2} \tag{A.1}$$

Since $R_0$ is a deterministic term, the variance of e would only involve the remaining two terms:

$$\text{Var}\, e = \text{Var}\left(\frac{1}{R_0}[\, X_0 \;\; Y_0\,]\begin{bmatrix}\Delta x\\ \Delta y\end{bmatrix}\right)$$

$$= \frac{1}{R_0^2}(X_0^2 \text{Var}\,\Delta x + 2 X_0 Y_0 \text{Cov}(\Delta x, \Delta y) + Y_0^2 \text{Var}\,\Delta y)$$

Now use this approximation to derive the terms of $C_{P\text{-}E}$. The $c_{EE}$ term is the variance of the horizontal solution error and is equal to Var e. The variance terms Var Var $\Delta x$, Cov ($\Delta x$, $\Delta y$), and Var $\Delta y$ are derived from the horizontal components of the solution error covariance given by Eq. (9). X0 and Y0 are determined from introducing a fault for satellite i (we ignore the vertical and time components $Z_0$ and $T_0$).

$$\begin{bmatrix}X_0\\ Y_0\\ Z_0\\ T_0\end{bmatrix} = A_w w \begin{bmatrix}\vdots\\ b_i\\ \vdots\end{bmatrix}$$

Do the same for the $c_{pp}$ term that represents the variance of the parity vector, except generalize Eq. (A.1) to accommodate a parity space that hat (n-4) dimensions, where n is the number of satellites.

$$p \approx D + \frac{1}{D}[\lambda_1 \;\ldots\; \lambda_{n-4}]\begin{bmatrix}\delta_1\\ \vdots\\ \delta_{n-4}\end{bmatrix} \qquad (A.2)$$

where $$D = \sqrt{\lambda_1^2 + \ldots + \lambda_{n-4}^2}$$

However, since the parity space was transformed to normalize the distribution, $$\text{Var}\, p = \text{Var}\left(\frac{1}{D}[\lambda_1 \;\ldots\; \lambda_{n-4}]\begin{bmatrix}\delta_1\\ \vdots\\ \delta_{n-4}\end{bmatrix}\right)$$

$$\text{Since Var}\begin{bmatrix}\delta_1\\ \vdots\\ \delta_{n-4}\end{bmatrix} = I$$

$$\text{Var}\, p = \frac{1}{D^2}\cdot D^2 = 1$$

Finally, the cross term $C_{PE}$ is needed.

Cov (p,e)

$$\text{Cov}(p, e) = E\left(\frac{1}{D}[\lambda_1 \;\cdots\; \lambda_{n-4}]\begin{bmatrix}\delta_1\\ \vdots\\ \delta_{n-4}\end{bmatrix}, \left\{\frac{1}{R_0}[\, X_0 \;\; Y_0\,]\begin{bmatrix}\Delta x\\ \Delta y\end{bmatrix}\right\}^T\right)$$

$$= \frac{1}{DR_0}[\lambda_1 \;\ldots\; \lambda_{n-4}] E\left(\begin{bmatrix}\delta_1\\ \vdots\\ \delta_{n-4}\end{bmatrix}\begin{bmatrix}\Delta x\\ \Delta y\end{bmatrix}^T\right)\begin{bmatrix}X_0\\ Y_0\end{bmatrix}$$

where, from Eq. (8), $$\begin{bmatrix}\lambda_1\\ \vdots\\ \lambda_{n-4}\end{bmatrix} = P\begin{bmatrix}0\\ b_i\\ \vdots\\ 0\end{bmatrix}$$

$$\begin{bmatrix}\delta_1\\ \vdots\\ \delta_{n-4}\end{bmatrix} = P\begin{bmatrix}\varepsilon_1\\ \varepsilon_2\\ \vdots\\ \varepsilon_n\end{bmatrix}$$

and $$\begin{bmatrix}\Delta x\\ \Delta y\end{bmatrix}$$

is a subvector of $$\begin{bmatrix}\begin{bmatrix}\Delta x\\ \Delta y\end{bmatrix}\\ \Delta z\\ \Delta t\end{bmatrix} = A_w w \begin{bmatrix}\varepsilon_1\\ \varepsilon_2\\ \vdots\\ \varepsilon_n\end{bmatrix}$$

What is claimed is:

1. An integrity monitoring system for an aircraft, comprising:
   a weight generation subsystem, generating a set of non-uniform weights based on a least squares approximation of a linearized measurement equation;
   a receiver autonomous integrity monitoring (RAIM) subsystem applying the set of non-uniform weights; and
   a horizontal integrity limit (HIL) subsystem generating a reduced horizontal integrity limit based on the output of the RAIM subsystem.

2. The system of claim 1, wherein the non-uniform weights are generated in the form of a square matrix.

3. The system of claim 2, wherein the square matrix is a diagonal matrix.

4. The system of claim 3, wherein the elements of the diagonal matrix are non-negative.

5. The system of claim 1, further comprising:
   a HIL evaluation subsystem.

6. The system of claim 5, wherein the HIL evaluation subsystem uses a lookup table.

7. An integrity monitoring system, comprising:
   matrix including a set of non-uniform weights, based on a least squares approximation of a linearized measurement equation;
   a receiver autonomous integrity monitoring (RAIM) system for applying the set of the non-uniform weights; and an integrity limit subsystem for determining a reduced integrity limit based on the output of the RAIM system.

8. The system of claim 7, wherein the non-uniform weights are provided in the form of a square matrix.

9. The system of claim 8, wherein the square matrix is a diagonal matrix.

10. The method of claim 9, wherein the elements of the diagonal matrix are non-negative.

11. The method of claim 7, further comprising:
a means for applying a look-up table method for evaluation of the integrity limit.

12. An autonomous integrity monitoring system for use in a receiver, comprising:
a weight generation subsystem for determining a set of non-uniform weights, based on a least squares approximation of a linearized measurement equation;
a weight application subsystem for applying the non-uniform weights; and
an integrity limit subsystem for providing a reduced integrity limit based on an output of the weight application subsystem.

13. The system of claim 12, wherein the non-uniform weights are provided in the form of a square matrix.

14. The system of claim 13, wherein the square matrix is a diagonal matrix.

15. The system of claim 14, wherein the elements of the diagonal matrix are non-negative.

16. The system of claim 12, further comprising:
a look-up subsystem for applying a look-up table method for evaluation of the integrity limit.

* * * * *